US012590035B2

(12) United States Patent (10) Patent No.: US 12,590,035 B2
Rousselle et al. (45) Date of Patent: Mar. 31, 2026

(54) METHOD FOR MANUFACTURING AN ABRADABLE LAYER

(71) Applicants: SAFRAN AIRCRAFT ENGINES, Paris (FR); CENTRE NATIONAL DE LA RECHERCHE SCIENTIFIQUE, Paris (FR); UNIVERSITE PAUL SABATIER—TOULOUSE III, Toulouse Cedex (FR); INSTITUT NATIONAL POLYTECHNIQUE DE TOULOUSE, Toulouse Cedex (FR)

(72) Inventors: Mélanie Rousselle, Moissy-Cramayel (FR); Florence Ansart, Labege (FR); Claude Gilbert Jean-Pierre Estournes, Rieumes (FR); Guillaume Fradet, Moissy-Cramayel (FR); Arnaud Louis Gabriel Fregeac, Moissy-Cramayel (FR); Serge Georges Vladimir Selezneff, Moissy-Cramayel (FR)

(73) Assignees: SAFRAN AIRCRAFT ENGINES, Paris (FR); CENTRE NATIONAL DE LA RECHERCHE SCIENTIFIQUE, Paris (FR); UNIVERSITE PAUL SABATIER—TOULOUSE III, Toulouse Cedex (FR); INSTITUT NATIONAL POLYTECHNIQUE DE TOULOUSE, Toulouse Cedex (FR)

( * ) Notice: Subject to any disclaimer, the term of this patent is extended or adjusted under 35 U.S.C. 154(b) by 70 days.

(21) Appl. No.: 18/562,954

(22) PCT Filed: May 16, 2022

(86) PCT No.: PCT/FR2022/050928
§ 371 (c)(1),
(2) Date: Nov. 21, 2023

(87) PCT Pub. No.: WO2022/248789
PCT Pub. Date: Dec. 1, 2022

(65) Prior Publication Data
US 2024/0262752 A1 Aug. 8, 2024

(30) Foreign Application Priority Data

May 25, 2021 (FR) ..................................... 21 05432

(51) Int. Cl.
$C04B\ 35/48$ (2006.01)
$C04B\ 35/50$ (2006.01)
$C04B\ 35/626$ (2006.01)
$C04B\ 35/645$ (2006.01)
$C23C\ 24/08$ (2006.01)

(52) U.S. Cl.
CPC .............. $C04B\ 35/48$ (2013.01); $C04B\ 35/50$ (2013.01); $C04B\ 35/62675$ (2013.01);
(Continued)

(58) Field of Classification Search
CPC ................................ C04B 35/48; C23C 24/08
See application file for complete search history.

(56) References Cited

U.S. PATENT DOCUMENTS

2006/0024513 A1 2/2006 Schlichting et al.

FOREIGN PATENT DOCUMENTS

CN 102060551 A 5/2011
EP 2 165 991 A2 3/2010
(Continued)

OTHER PUBLICATIONS

FR3082765, Machine translation. (Year: 2019).*
(Continued)

*Primary Examiner* — Robert A Vetere
(74) *Attorney, Agent, or Firm* — Oblon, McClelland, Maier & Neustadt, L.L.P.

(57) ABSTRACT

A method for manufacturing an abradable layer and a substrate coated with this layer, may include: preparing a powder composition including at least ceramic particles and an inorganic filler having a lamellar crystallographic structure, the volume content of the inorganic filler in the powder composition being in a range of from 1 to 75%; compressing the powder composition; and sintering the powder composition thus compressed in order to obtain the abradable layer.

19 Claims, 12 Drawing Sheets

(52) U.S. Cl.
CPC ............ C04B 35/645 (2013.01); C23C 24/08
(2013.01); *C04B 2235/3227* (2013.01); *C04B 2235/3246* (2013.01); *C04B 2235/447* (2013.01); *C04B 2235/6567* (2013.01); *C04B 2235/666* (2013.01)

(56) References Cited

FOREIGN PATENT DOCUMENTS

| EP | 2 165 991 | A3 | 3/2010 | |
| FR | 3 044 945 | | 6/2017 | |
| FR | 3082765 | A1 * | 12/2019 | ................ B22F 7/02 |

OTHER PUBLICATIONS

Zhao et al., "Properties of Yttria-Stabilized-Zirconia Based Ceramic Composite Abradable Coatings Ceramic Composite Abradable Coatings," 2012, Key Engr. Matl., vols. 512-515, pp. 1551-1554. (Year: 2012).*

International Search Report issued Sep. 5, 2022 in PCT/FR2022/050928, filed on May 16, 2022, 3 pages.

French Preliminary Search Report & Written Opinion issued Feb. 9, 2022 in FR Application 21 05432, filed on May 25, 2021, 9 pages (with English Translation of Categories of Cited Documents).

Zhao et al. "Properties of Yttria-Stabilized-Zirconia Based Ceramic Composite Abradable Coatings", *Key Engineering Materials* vols. 512-515 (2012) pp. 1551-1554 (6 pages).

Kim et al. "Effects of monazite-type $LaPO_4$ and powder processing on the mechanical and thermal properties of yttria stabilized zirconia composites", *Journal of Ceramic Processing Research*. vol. 12, No. 3, pp. 240-246 (2011).

Foroushani et al. "Porosity analysis and oxidation behavior of plasma sprayed YSZ and $YSZ/LaPO_4$ abradable thermal barrier coatings", Ceramics International 42, 2016, pp. 15868-15875.

Office Action issued on Oct. 21, 2025, in corresponding Chinese patent application No. CN 2022800380268 (with English translation).

* cited by examiner

METHOD FOR MANUFACTURING AN ABRADABLE LAYER

CROSS-REFERENCE TO RELATED APPLICATIONS

The present application is the national stage of international application PCT/FR2022/050928, filed on May 16, 2022, and claims the benefit of the filing date of French Appl. No. 2105432, filed on May 25, 2021.

TECHNICAL FIELD

The present invention relates to a method for manufacturing an abradable layer and a substrate coated by this layer.

Such an abradable layer can, in particular, be used for equipping a rotary machine ring in order to ensure the sealing of the machine at the tip of the rotating blades, for example. Such an abradable layer is very particularly suitable for equipping turbine rings in the field of aeronautics, and very particularly in aircraft turbojet engines.

PRIOR ART

Abradable layers are currently used in gas turbines in order to minimise the functional clearance, and therefore leaks, between the rotating parts and the static parts. For high pressure turbine applications, abradable seals are deposited on ring sectors attached to the casing. During a contact of the turbine blades with the abradable material, the latter must be worn in priority, which enables the aerodynamic performance of the engine to be maintained.

However, it is also necessary to protect the substrate from high temperatures, which can reach 1600° C., and from erosion by the gas flow emerging at high temperature and pressure. With this in view, a ceramic coating based on refractory metals is usually formed by thermal spraying onto the static parts that are the ring sectors, in order to form a thermal-barrier type protective coating. However, the coatings thus obtained cannot present a very high abradability, which can lead to wear at the tips of the blades in operation, causing complex and expensive repairs Various solutions have been envisaged in the prior art, in order to increase the abradable nature of the thermal barriers. To this end, these include the incorporation of pore-forming agents with a view to increasing the porosity ratio of the barrier. These solutions cannot, however, give complete satisfaction because they can significantly degrade the erosion resistance of the coating and therefore the lifespan of the barrier and of the underlying substrate.

Another solution, described in application FR 3 044 945 uses spark plasma sintering (SPS) in order to generate abradable coatings having gradients of properties including, in particular, a lower porosity ratio at the edges of the coating, in order to better resist erosion. However, although offering good results, this solution requires a particular preparation of the substrate.

Another solution, described in application FR 3 082 765, uses yttria-stabilised zirconia powders, having various form factors. This solution offers very good results; however, this solution results in relatively high porosity ratios, between 30 and 50%, so that an even higher erosion resistance is desired for certain particularly demanding applications.

There is therefore a need to provide a method for manufacturing an abradable layer having both good abradability and good erosion resistance.

DISCLOSURE OF THE INVENTION

The present disclosure relates to a method for manufacturing an abradable layer, comprising the following steps: preparing a powder composition comprising at least ceramic particles and an inorganic filler having a lamellar crystallographic structure, the volume content of the inorganic filler in the powder composition being between 1 and 75%; compressing the powder composition and sintering the powder composition thus compressed in order to obtain the abradable layer.

The use of the powder composition defined above and a pressurised sintering technique, advantageously makes it possible to obtain a layer having both good abradability and good erosion resistance. In addition, the inventors have observed that the abradable layers formed by sintering under pressure have better erosion resistance compared with the layers formed by plasma spraying at the same porosity ratio or even, in some cases, if the porosity ratio is a greater.

Moreover, the inorganic filler makes it possible to fill some of the resulting macropores in the ceramic matrix at the end of the sintering step. Thus, a lower porosity ratio is obtained, which offers better erosion resistance.

However, this lower porosity ratio is not accompanied by a loss of abradability. Indeed, thanks to its lamellar crystallographic structure, the inorganic filler has solid lubrication properties which generate weak interfaces between the ceramic matrix and the inorganic filler, which promotes the propagation of cracks and mechanically weakens the ceramic matrix. Consequently, the composite thus formed has, despite a lower porosity rate, toughness and microhardness values comparable to those of a conventional ceramic abradable layer.

In some embodiments at least 50% by number, preferably at least 80% by number, more preferably at least 95% by number, of the ceramic particles have a form factor greater than or equal to 3, and preferably greater than or equal to 5. It is however preferably less than or equal to 30. In particular, the ceramic particles can be ceramic fibres Such particles lead to an oriented microstructure promoting dislocations between the filler and the matrix, as well as the propagation of cracks. They also lead to two types of porosity: an intra-fibre mesoporosity and a macroporosity between the fibres and the inorganic filler.

Unless otherwise mentioned, the average form factor by number corresponds to the average number value of the following ratio R calculated for each particle of a given set of particles, with R designating the ratio [largest dimension of the particle]/[largest transverse dimension of the particle].

In some embodiments at least 50% by number, preferably at least 80% by number, more preferably at least 95% by number, of the ceramic particles have a form factor less than or equal to 1.5, and preferably less than or equal to 1.1. Under such conditions, the inorganic filler forms agglomerates of variable sizes with the particles of the ceramic matrix.

In some embodiments at least 50% by number, preferably at least 80% by number, more preferably at least 95% by number, of the ceramic particles have a size between 10 and 100 µm. It is intended to consider here the largest dimension of the particle.

In some embodiments the ceramic particles are yttria-stabilised zirconia particles. Such material is generally designated by the abbreviation (YSZ).

In some embodiments, the inorganic filler has a chemical and structural temperature resistance greater than 1300° C.

This enables the inorganic filler to resist the high temperatures prevailing, in particular, in the turbines of turbomachines.

In some embodiments, the inorganic filler has a coefficient of thermal expansion close to the coefficient of thermal expansion of ceramic particles, to within ±20%, preferably within ±15%. This reduces the risk of observing a differential expansion within the abradable layer which would risk microcracking, which would strongly reduce its erosion resistance.

In some embodiments the inorganic filler has a thermal conductivity less than 10 W·m−1·K, preferably less than 5 W·m−1·K. The inorganic filler thus contributes to thermally protecting the substrate of the abradable layer against the high temperatures prevailing, in particular, in the turbines of turbomachines.

In some embodiments, the microhardness of the inorganic filler is less than the microhardness of the ceramic particles, preferably by at least 20%, more preferably by at least 50%. In particular, the microhardness of the ceramic particles can be less than 5 GPa. The inorganic filler thus has a low mechanical strength which contributes to good abradability of the abradable layer.

In some embodiments, the Young's modulus of the inorganic filler is less than the Young's modulus of the ceramic particles, preferably by at least 20%. In particular, the Young's modulus of the inorganic filler can be less than 180 GPa. The inorganic filler thus has a low mechanical strength which contributes to good abradability of the abradable layer.

In some embodiments, the toughness of the inorganic filler is less than the toughness of the ceramic particles, preferably by at least 20%, more preferably by at least 80%. In particular, the toughness of the inorganic filler can be less than 2 MPa·m$^{1/2}$.

In some embodiments, the inorganic filler is a lanthanum oxide, preferably LaPO$_4$ or La$_2$Zr$_2$O$_7$. These compounds meet all the desired criteria, both mechanical and thermal.

In some embodiments, at least 50 vol %, preferably at least 80 vol %, and more preferably at least 95 vol %, of the inorganic filler is in a dehydrated phase. It may, in particular, be a monazite phase. The effect of such a dehydrated phase is better solid lubrication and dislocation properties.

In some embodiments, the method comprises a thermal pretreatment step of the inorganic filler performed at a temperature between 800 and 1600° C., preferably at a temperature between 800 and 1400° C., more preferably at a temperature between 900 and 1200° C., yet more preferably at a temperature between 1000 and 1150° C., and even more preferably between 1050 and 1150° C. Such a thermal pretreatment step makes it possible to control the crystallinity of the inorganic filler and its change into the dehydrated phase. Insofar as the crystallinity of the phase influences the sintering behaviour of the inorganic filler, this step can control the mechanical properties of the filler, as well as its cohesion with the ceramic matrix. In particular, this step makes it possible to adjust the microstructure of the inorganic filler in order to allow good compatibility between the sintering temperature of the filler and the sintering temperature of the matrix and, thus, to obtain a homogeneous consolidation of the assembly leading to good abradable behaviour.

In some embodiments, the thermal pretreatment step of the inorganic filler is performed for a duration of 30 to 120 minutes, preferably for a duration of 60 to 120 minutes.

In some embodiments, the content by volume of the inorganic filler in the powder composition is between 10 and 50%, preferably between 25 and 35%. Indeed, the inventors have determined that such contents make it possible to obtain an excellent compromise between abradability and erosion resistance.

In some embodiments, the powder composition substantially consists of said ceramic particles and said inorganic filler.

In some embodiments, the method comprises a step of mixing the powder composition. Such a mixing step can control the dispersion of the inorganic filler within the ceramic matrix. It also influences the form factor of the ceramic particles. It is thus possible to control the mixture in order to obtain, by choice, agglomerated mixtures or even more homogeneous mixtures.

In some embodiments, the mixing step is performed by dry mixing, preferably using a three-dimensional dynamic mixer.

In some embodiments, the three-dimensional dynamic mixer comprises mixing beads, the mass ratio of the mixing beads relative to the powder composition being between 0:1 and 1:1. A mass ratio close to 1:1, for example greater than 0.8:1, makes it possible to obtain a more homogeneous mixture, whereas a mass ratio close to 0:1, for example less than 0.2:1, makes it possible to obtain a more agglomerated mixture.

In some embodiments, the duration of the mixing step is between 5 minutes and 4 hours, preferably between 1 and 2 hours.

In some embodiments, the mixing step is performed by liquid mixing.

In some embodiments, the mixing step is performed by synthesis of the inorganic filler directly in a suspension of ceramic particles. This makes it possible to obtain ceramic particles coated with inorganic filler, which causes a different, equally interesting, distribution of the filler in the microstructure after sintering.

In some embodiments, the sintering step is performed by spark plasma sintering. Such a sintering technique enables much better control of the sintering parameters and, thus, the porosity ratio obtained at the end of sintering.

In some embodiments, the pressure applied during sintering, the temperature imposed and the duration of the sintering are chosen so as to obtain a volumetric porosity ratio of the abradable layer between 0.1 and 50%, preferably between 25 and 35%, Which is less than the porosity ratios generally observed in conventional ceramic abradable layers.

In some embodiments, during the sintering step, the powder composition is subject to a uniaxial pressure between 25 and 100 MPa, preferably between 80 and 100 MPa or between 40 and 60 MPa.

In some embodiments, during the sintering step, the temperature imposed is between 900 and 1200° C., preferably between 1100 and 1200° C. Preferably, such a temperature is imposed once the pressure is applied.

In some embodiments, the duration of the sintering step is between 1 and 30 minutes.

The present disclosure also concerns a method for manufacturing a substrate coated by an abradable layer, the substrate being a turbomachine part, wherein the abradable layer is formed on the substrate by implementing a method according to any one of the preceding embodiments, the powder composition being deposited on a surface of the substrate.

This alternative relates to the case where first the powder composition is deposited on the substrate, then the abradable layer is formed directly on the substrate by sintering under pressure of the deposited powder composition.

The present disclosure also relates to a method for manufacturing a substrate coated by an abradable layer, the substrate being a turbomachine part, comprising the following steps: manufacturing an abradable layer by implementing a method according to any one of the preceding embodiments, depositing the abradable layer thus manufactured on a surface of the substrate, and joining the abradable layer thus deposited to the surface of the substrate.

This alternative relates to the case where first the abradable layer is formed, then this abradable layer is deposited on the substrate and then joined thereto.

In some embodiments, the substrate is metallic or made from a ceramic matrix composite material.

In some embodiments, the substrate is a turbine or compressor ring sector.

In the present disclosure, the terms "axial", "radial", "tangential", "inner", "outer" and their derivatives are defined with respect to the principal axis of the turbomachine. The term "axial plane shall mean a plane passing through the principal axis of the turbomachine and the term "radial plane" shall mean a plane perpendicular to this principal axis; finally, the terms "upstream" and "downstream" are defined with respect to the flow of air in the turbomachine.

The above-mentioned features and advantages, and others, will become apparent on reading the detailed description which follows, of exemplary embodiments of the proposed methods. This detailed description refers to the attached drawings.

BRIEF DESCRIPTION OF THE FIGURES

The attached drawings are schematic and primarily aim to illustrate the principles of the disclosure.

In these drawings, from one figure to another, identical elements (or parts of elements) are identified by the same reference signs.

DESCRIPTION OF THE EMBODIMENTS

In order to make the disclosure more concrete, examples of methods are described in detail below, with reference to the attached drawings. It is recalled that the invention is not limited to these examples.

Figure 1:
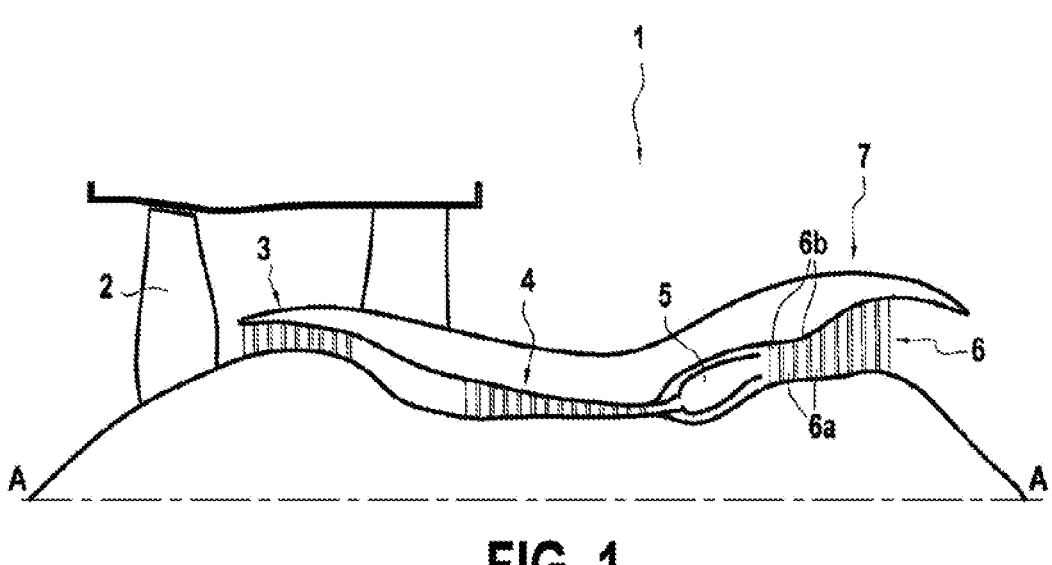
FIG. 1 is a sectional plane of a turbomachine.

FIG. 1 shows a vertical sectional plane passing through the principal axis A, of a turbofan engine 1. It includes, from upstream to downstream in the circulation of the air flow, a fan 2, a low-pressure compressor 3, a high-pressure compressor 4, a combustion chamber 5, a high-pressure turbine 6 and a low-pressure turbine 7.

Figure 2:
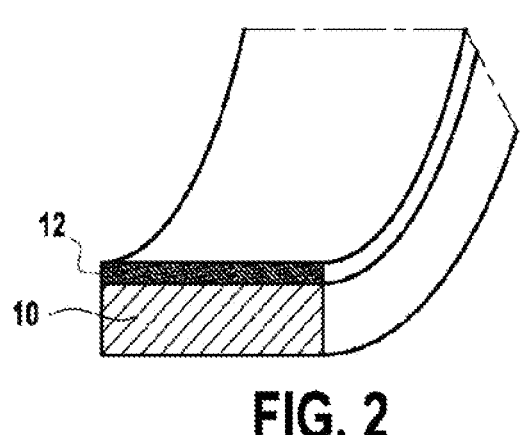
FIG. 2 is a partial perspective and schematic view of an example of a substrate coated by the method according to the disclosure.

The high-pressure turbine 6 comprises a plurality of blades 6a turning with the rotor, and flow straighteners 6b mounted on the stator. The stator of the turbine 6 comprises a plurality of stator rings disposed opposite the moving blades 6a of the turbine 6. FIG. 2 illustrates a stator ring, which is divided into a plurality of sectors, each comprising a substrate 10 coated with an abradable layer 12. The moving blades 6a of the rotor rub on the abradable layer 12 in the event of radial incursion of the rotor.

Figure 3A:
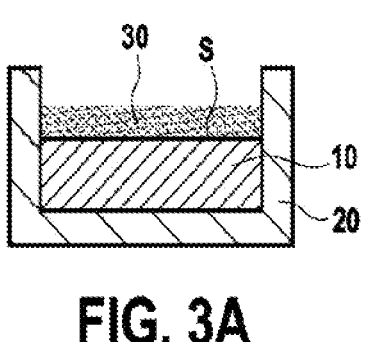
FIGS. 3A-3B schematically illustrate two successive steps of an exemplary method according to the disclosure.
Figure 3B:
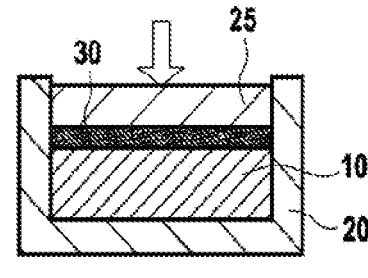

An embodiment of the abradable layer 12 will be described with reference to FIGS. 3A and 3B. These FIGS. 3A and 3B schematically illustrate the implementation of an exemplary method according to the invention.

The substrate 10 to be coated is disposed in the cavity of a mould 20. The powder composition 30 is then deposited on a surface S of the substrate 10. As shown in FIG. 3B, the mould 20 is then closed. A contact face of its cover 25 is applied against the layer of powder composition 30 so as to compress this on the substrate 10. The compression pressure applied on the powder composition 30 can be a uniaxial pressure. The thickness of the layer of powder composition 30 is thus reduced due to the compression between the substrate 10 and the cover 25. The powder composition 30 subjected to the compression pressure is then sintered. A spark plasma sintering technique ("SPS") can be performed to produce the abradable layer 12. The abradable layer 12 is obtained at the end of this sintering step.

In the illustrated example, the abradable layer 12 obtained has a substantially uniform density. Alternatively, abradable layers can be formed with variable density, as described in application FR 3 044 945.

An example is described, with reference to the figures, in which the abradable layer 12 is formed directly on the substrate 10 from the powder composition 30 deposited beforehand on the substrate 10.

In an alternative that is not illustrated, it is possible to first form the abradable layer 12 on a support that is distinct from the substrate by implementing the sintering method under pressure which was described above. According to this alternative, the abradable layer 12 thus formed is then separated from the support in order to be positioned on the surface S of the substrate 10. This abradable layer 12 thus positioned is then joined to the surface S of the substrate 10 in order to obtain the coated substrate. This joining can be carried out by brazing, sintering or using added elements (bolting, for example).

The abradable layer 12 formed is particularly suitable for equipping high-pressure or low-pressure turbine rings or compressor rings, for example in the aeronautical field, and more particular in aircraft turbojet engines.

Various details relating to the substrate 10, to the powder composition 30 and to the operating parameters that can be imposed during the method, will now be described.

The substrate 10 can be a part for a turbomachine. The substrate 10 can be made of metal material, for example made of superalloy. When the substrate 10 is made of metal material, the latter can for example be formed by one of the following materials: alloy AMI, alloy C263 or alloy M509.

Alternatively, the substrate 10 can be made of a CMC material. In this case, the substrate 10 can include a woven fibrous reinforcement, formed of carbon fibres or silicon carbide fibres, densified by a ceramic matrix, comprising for example silicon carbide. A detailed example of manufacture of ring sectors made of CMC is described, in particular, in document US 2012/0027572.

The substrate 10 can be coated with an anchoring layer (not shown) that the abradable layer 12 is intended to coat. In the case of a metallic substrate 10, it is possible, for example, to use an MCrAlY anchoring layer, for example a CoNiCrAlY anchoring layer. In the case of a substrate made of CMC, it is possible to use a mullite anchoring layer, for example.

With regard to the powder composition 30, this comprises ceramic particles and an inorganic filler.

Figure 4:
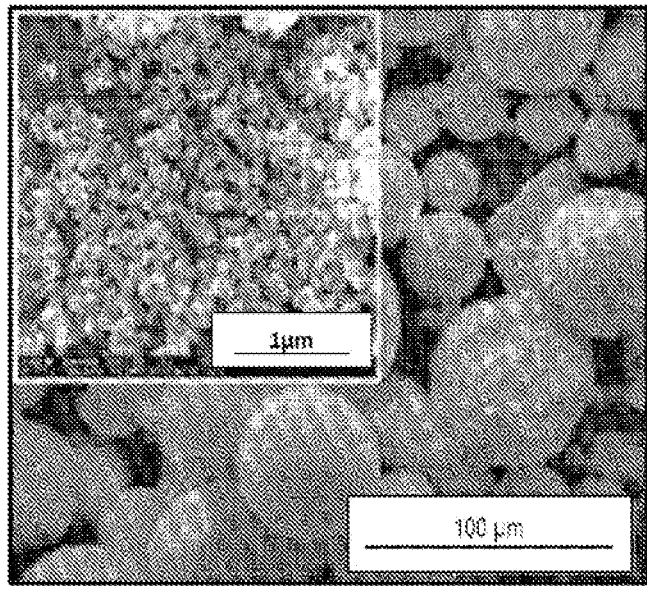
FIG. 4 is a scanning electron micrograph of a first type of ceramic particles that can be used in the powder composition.

The ceramic particles, forming a powder, are made from yttria-stabilised zirconia (YSZ). In certain examples, these particle are nanometric spherical, or quasi-spherical, particles, having an average form factor by number between 0.9 and 1.1, preferably between 1.0 and 1.1, for example substantially equal to 1. Such particles can be seen in the small frame in FIG. 4.

These nanometric ceramic particles can have an average diameter, in the non-agglomerated state, less than or equal to 70 nm, for example between 30 nm and 70 nm. The diameter can be measured using a field emission gun scanning electron microscope (FEG-SEM). The average diameter corresponds to the number average.

An example of usable nanometric ceramic particles are the particles marketed by Tosoh under reference Zirconia TZ 6Y.

Figure 5:
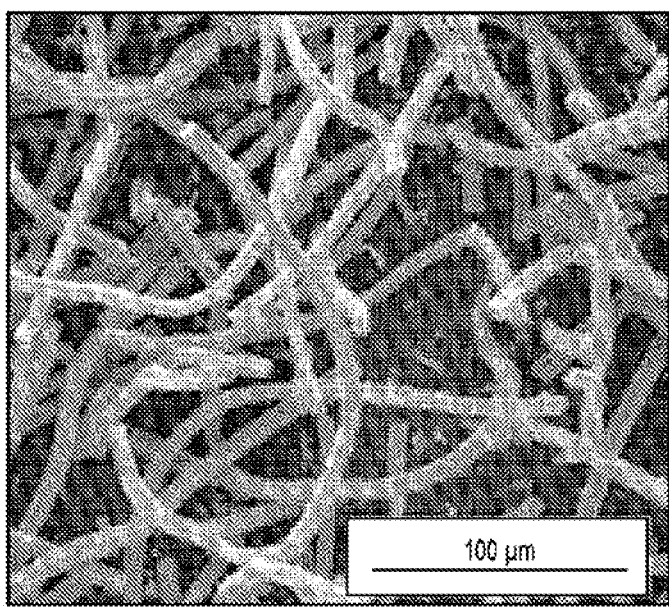
FIG. 5 is a scanning electron micrograph of a second type of ceramic particles that can be used in the powder composition.

In other examples, these particles are fibrous: they thus have variable form factors, between 5 and 30, preferably between 15 and 25. Such particles can be seen in FIG. 5.

The fibrous particles can have an average diameter, in the non-agglomerated state, (or average width) greater than or equal to 6 μm, for example between 6 μm and 8 μm. The fibrous particles can have an average length greater than or equal to 125 μm, for example between 125 μm and 215 μm.

The fibrous particles usable in the context of the disclosure can correspond to those described in patent application FR 3 082 765.

The inorganic filler takes the form of a powder of lanthanum phosphate $LaPO_4$. Such a powder is generally marketed in a rhabdophane-type hydrated phase. This is the case, in particular, for the powder marketed by Alfa Aesar under reference LPcom.

This commercial powder then undergoes an initial thermal treatment enabling it to be dehydrated and to control its crystallinity, the lanthanum phosphate then passing from the rhabdophane phase to the monazite phase. This thermal treatment is performed at a temperature at least equal to 800° C. and being able to reach 1400° C., or even 1600° C. The duration of this treatment can be between 30 and 120 minutes.

Figure 6A:
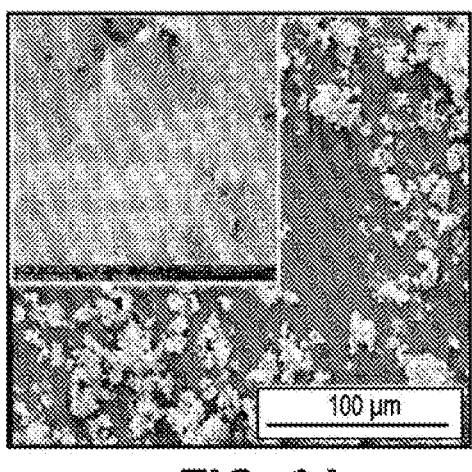
FIGS. 6A-6B are scanning electron micrographs of an inorganic filler that can be used in the powder composition, in a hydrated phase (FIG. 6A) and a dehydrated phase (FIG. 6B).
Figure 6B:
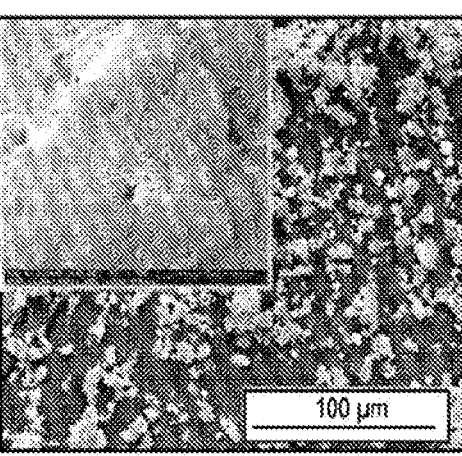
Figure 7:
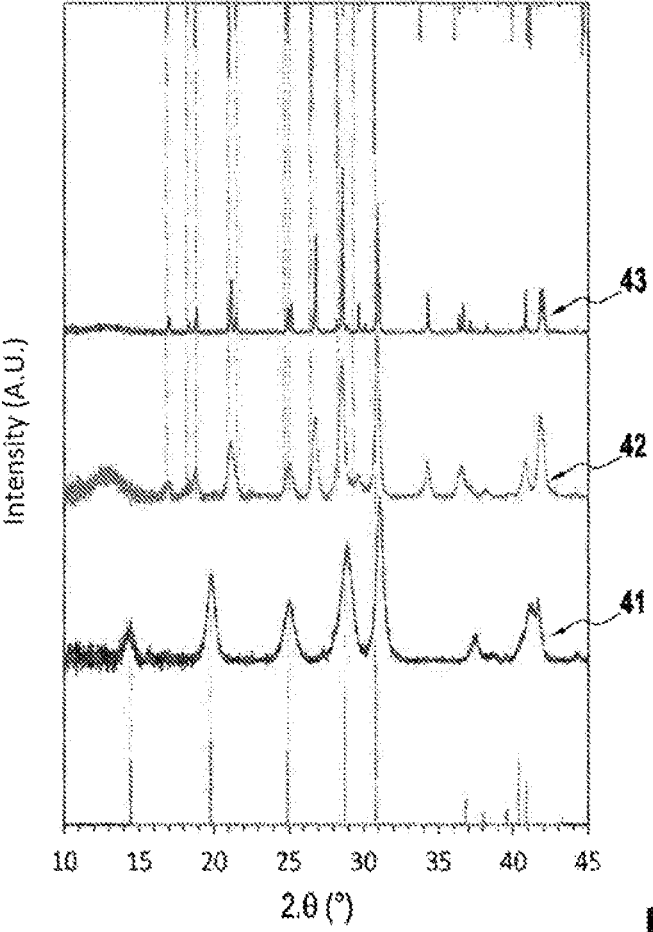
FIG. 7 is a graph illustrating the x-ray diffraction of such an inorganic filler in various hydration states.

FIGS. 6A and 6B thus illustrate the microstructure of this lanthanum phosphate $LaPO_4$ powder, before and after this initial thermal treatment, respectively. FIG. 7 shows x-ray diffraction graphs which highlight the change over time in the crystallinity of the inorganic filler. Curve 41 thus corresponds to the commercial hydrated $LaPO_4$ powder; curve 42 corresponds to this same powder after thermal treatment at 800° C.; and curve 43 corresponds to this same powder after thermal treatment at 1000° C. The narrowing of the diffraction peaks with the increase in temperature indicates a more advanced crystallisation.

The powder composition 30 is then obtained by mixing the ceramic powder with this dehydrated inorganic powder. The content by volume of inorganic powder in the powder composition 30 can theoretically be between 1 and 75%; however, the best results are obtained for a content by volume of inorganic powder between 25 and 35%.

The powder composition 30 then undergoes a dry mixing step using a three-dimensional dynamic mixer, for example a mixer marketed by WAB under the brand name Turbula. The duration of this mixing step can be between 5 minutes and 4 hours.

Mixing beads can be added to the powder composition in order to promote the mixing: when such beads are added, they can be added until reaching a mixing ratio Rm, corresponding to the mass ratio [mixing beads]:[powder], equal to 1:1.

Figure 8A:
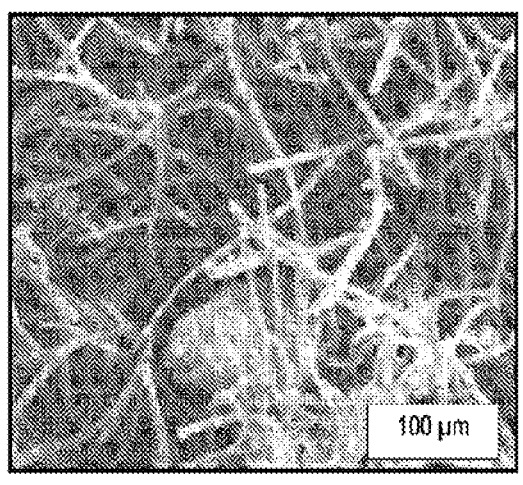
FIGS. 8A-8C are scanning electron micrographs of various powder compositions after mixing.

FIG. 8A shows the microstructure of a powder composition comprising 75 vol % fibrous particles of yttria-stabilised zirconia and 25% lanthanum monazite, after mixing for an hour with a mixing ratio of 0:1.

Figure 8B:
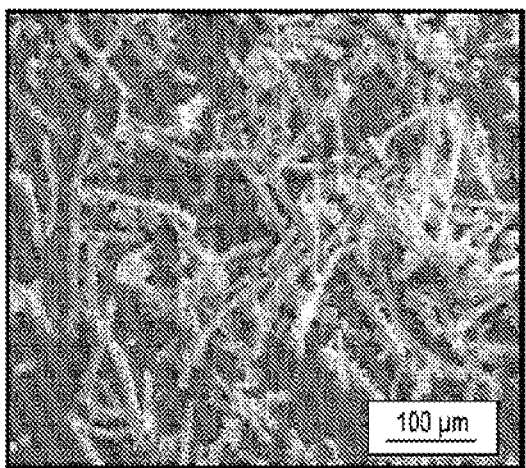

FIG. 8B shows the microstructure of the same powder composition comprising 75 vol % fibrous particles of yttria-stabilised zirconia and 25% lanthanum monazite, after mixing for an hour with a mixing ratio of 1:1.

Figure 8C:
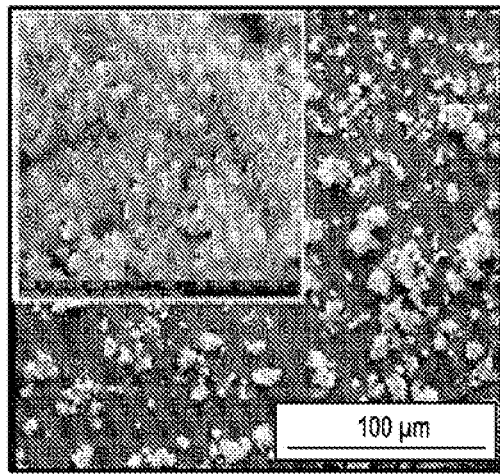

FIG. 8C shows the microstructure of a powder composition comprising 75 vol % nanometric particles of yttria-stabilised zirconia and 25% lanthanum monazite, after mixing for two hours with a mixing ratio of 1:1.

It is thus noted that FIG. 8A shows an agglomerated mixture with aggregates of inorganic filler in the middle of fibrous ceramic particles. By contrast, FIG. 8B shows a more homogeneous mixture.

Figure 9A:
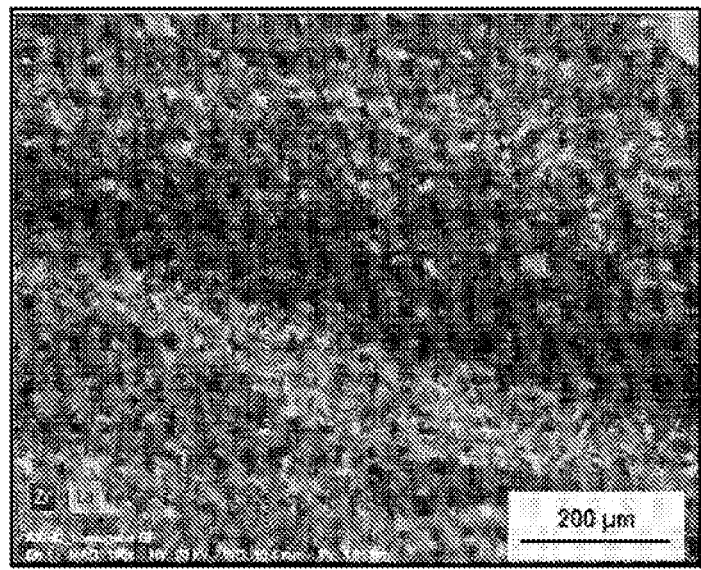
FIGS. 9A-9B are EDX maps (energy dispersive x-rays) of two abradable layers obtained after two different mixing steps.
Figure 9B:
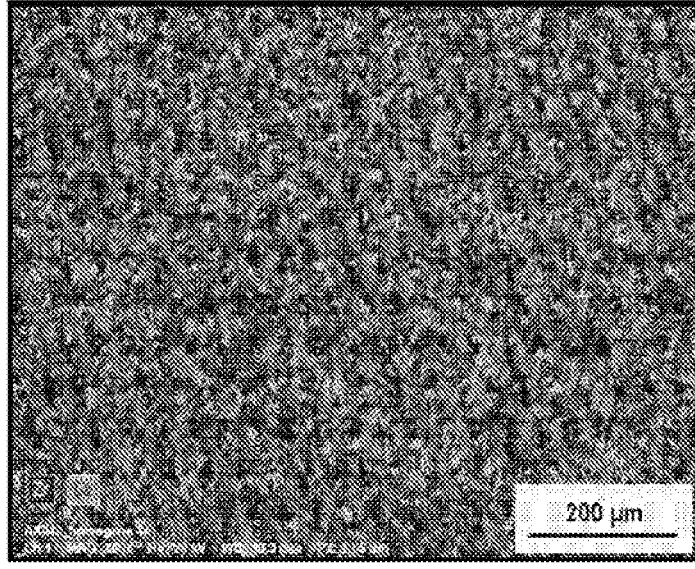

Such an agglomerated or homogeneous distribution is therefore found in the abradable layer after sintering: this is clearly visible in FIGS. 9A and 9B which show EDX mappings (energy-dispersive x-rays) of the abradable layers obtained respectively from the powder compositions of FIGS. 8A and 8B. Indeed, in these figures, the dark areas represent the presence of zirconia, thus of the ceramic matrix from the ceramic particles, and the light areas represent the presence of lanthanum, thus of the inorganic filler from the monazite particles.

Various details relating to the substrate 10 and to the powder composition 30 will now be described. Details will now be described relating to the abradable layer 12 which can be obtained as well as to the operating conditions which can be implemented.

The volumetric porosity ratio of the abradable layer 12 can be between 5% and 50%, for example between 15% and 40%, for example between 25% and 35% or even between 25% and 30%.

The temperature change imposed during sintering, the duration of sintering and/or the compression pressure applied, enable the volumetric porosity ratio of the resulting abradable layer 12 to be varied. The increase in temperature, the duration of sintering and/or the compression pressure can thus reduce the volumetric porosity ratio of the abradable layer 12.

Figure 10A:
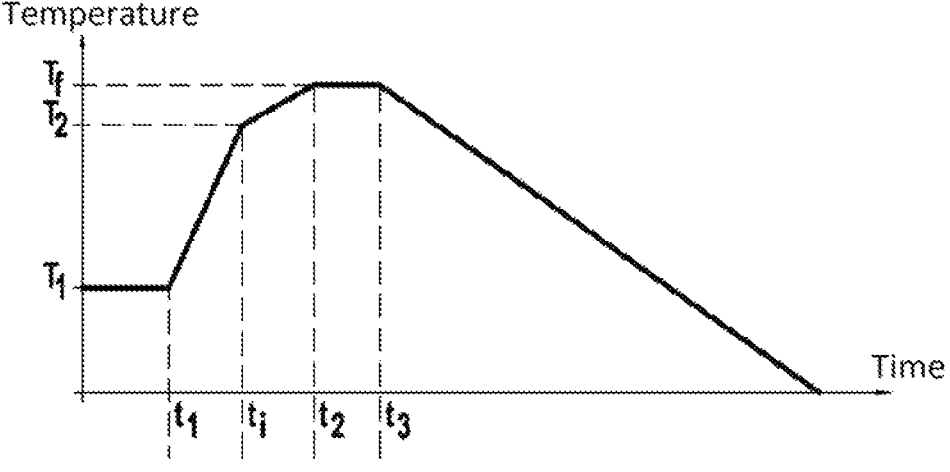
FIGS. 10A and 10B illustrate an example of change over time of temperature and compression pressure that can be used in the context of the disclosure.
Figure 10B:
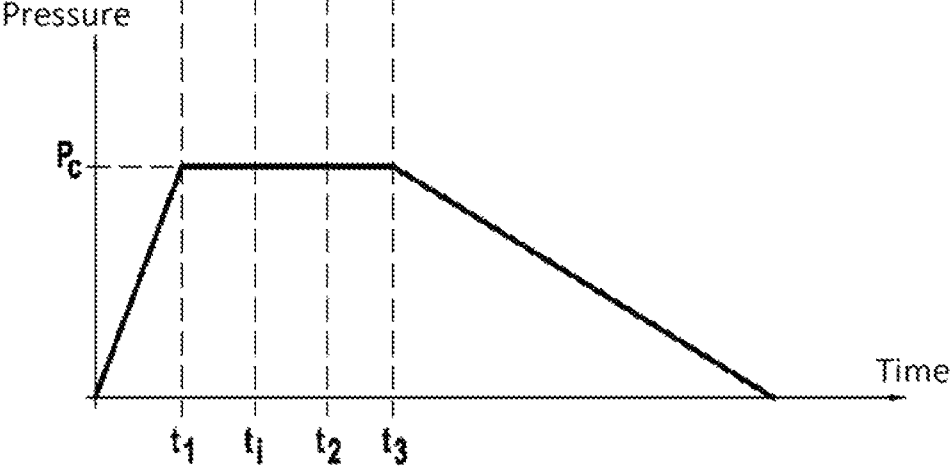
Figure 11:
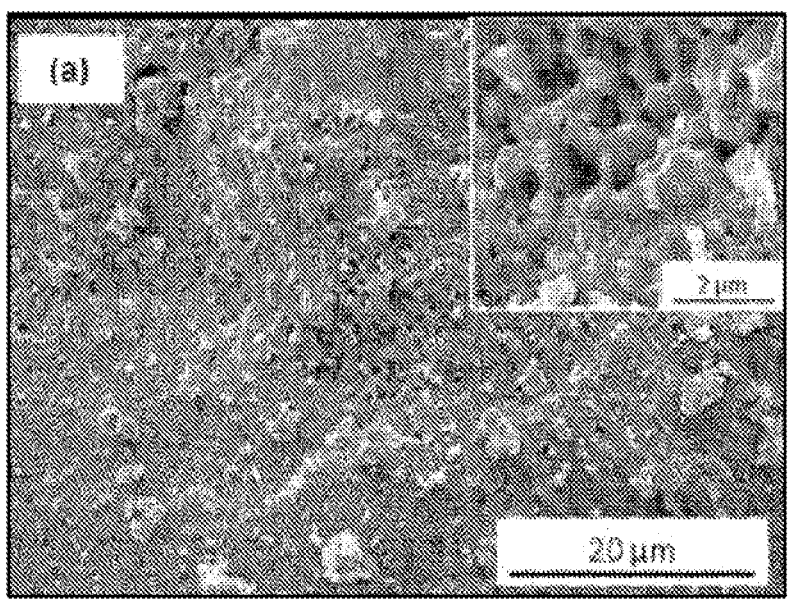
FIG. 11 is a scanning electron micrograph of a first abradable layer.

FIGS. 10 and 11 show a possible example of change over time in the compression pressure and the temperature during the manufacture of the abradable layer 12.

The assembly of the substrate 10 and the powder composition 30 is initially taken to a first temperature $T_1$, for example greater than or equal to 600° C. While the assembly is taken to this first temperature $T_1$, the compression pressure increases until reaching, at a first time $t_1$, a plateau with a value of $P_c$ which corresponds to the compression pressure which will be applied during the sintering of the powder composition 30.

The compression pressure $P_c$ imposed on the powder composition 30 during sintering can be between 25 and 100 Mpa, for example between 40 and 60 MPa, between 25 MPa and 50 MPa or between 50 MPa and 100 MPa. The compression pressure $P_c$ is maintained throughout the duration of the sintering of the powder composition 30.

From the first time $t_1$, the temperature imposed on the substrate 10 and on the powder composition 30 is increased up to the sintering temperature $T_f$. The temperature reaches the sintering temperature $T_f$ at a second time $t_2$ and is then maintained at this value. The sintering temperature $T_f$ depends on the nature of the powder composition 30 used. This sintering temperature $T_f$ can be between 900° C. and 1200° C., for example between 1100° C. and 1200° C.

The sintering temperature $T_f$ and the compression pressure $P_c$ are maintained until a third time $t_3$. The sintering duration $(t_3-t_2)$ can be greater than or equal to 1 minute, for example between 1 and 30 minutes. Once the sintering is ended, the compression pressure and the temperature are gradually reduced and the substrate 10 coated with the abradable layer 12 is then recovered.

In the illustrated example, a first rate of temperature increase is imposed between the first temperature $T_1$ and a greater second temperature $T_2$ reached at intermediate time $t_i$, then a second rate of temperature increase, less than the first rate of temperature increase, between the second temperature $T_2$ and the sintering temperature $T_f$. By way of illustration, the first rate of temperature increase can be greater than or equal to 100° C./minute and the second rate of temperature increase can be less than or equal to 50° C./minute. Still by way of illustration, the second temperature $T_2$ can be greater than or equal to 900° C. However, in other examples, the rate of temperature increase can be constant between the first temperature $T_1$ and the sintering temperature $T_f$.

FIG. 11 then shows the microstructure of a first example of abradable layer 12 obtained using such a method. In this first example, the powder composition comprises nanometric particles of yttria-stabilised zirconia at a level of 75 vol % and $LaPO_4$ particles at a level of 25 vol %. The $LaPO_4$ particles have previously undergone a thermal treatment step at 800° C. for 120 minutes. The mixing of the powder composition was performed by dry mixing for 120 minutes with a mixing ratio Rm equal to 1:1.

The sintering was performed by spark plasma sintering with a compression pressure $P_c$ of 100 MPa, a sintering temperature $T_f$ of 1150° C. and a duration of 10 minutes.

Figure 12:
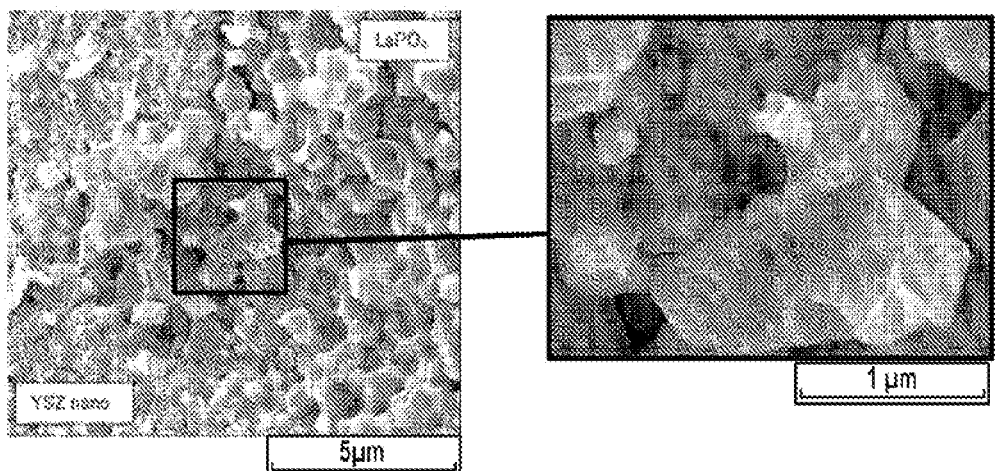
FIG. 12 is another scanning electron micrograph of the first abradable layer.
Figure 13A:
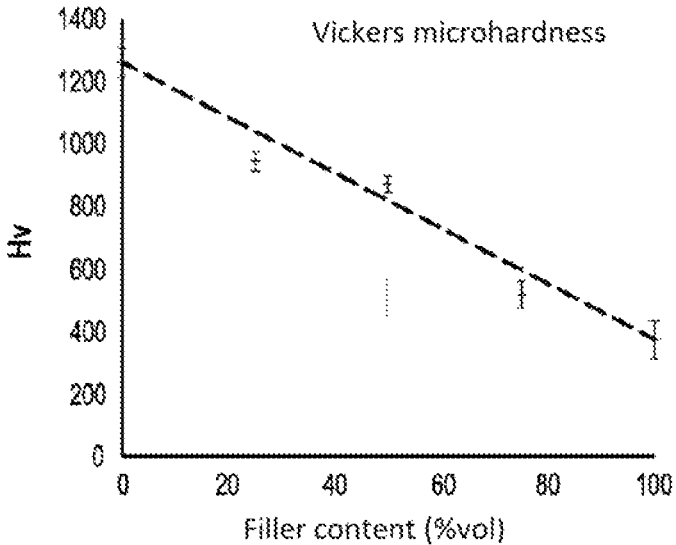
FIG. 13A is a graph illustrating the Vickers microhardness of the abradable layer as a function of the inorganic filler content.
Figure 13B:
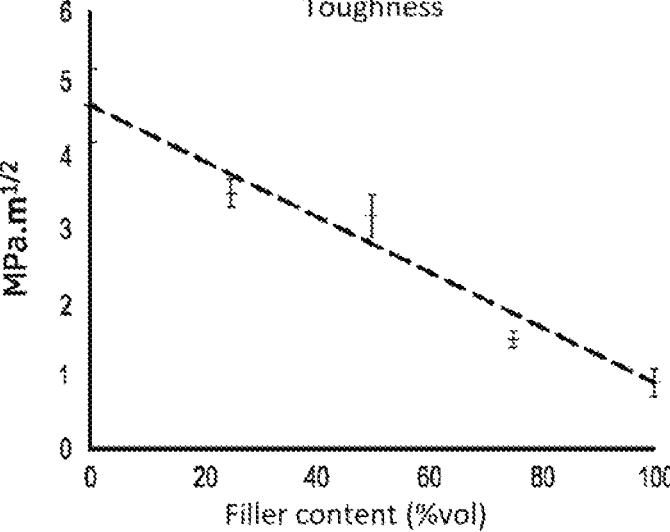
FIG. 13B is a graph illustrating the toughness of the abradable layer as a function of the inorganic filler content.
Figure 14:
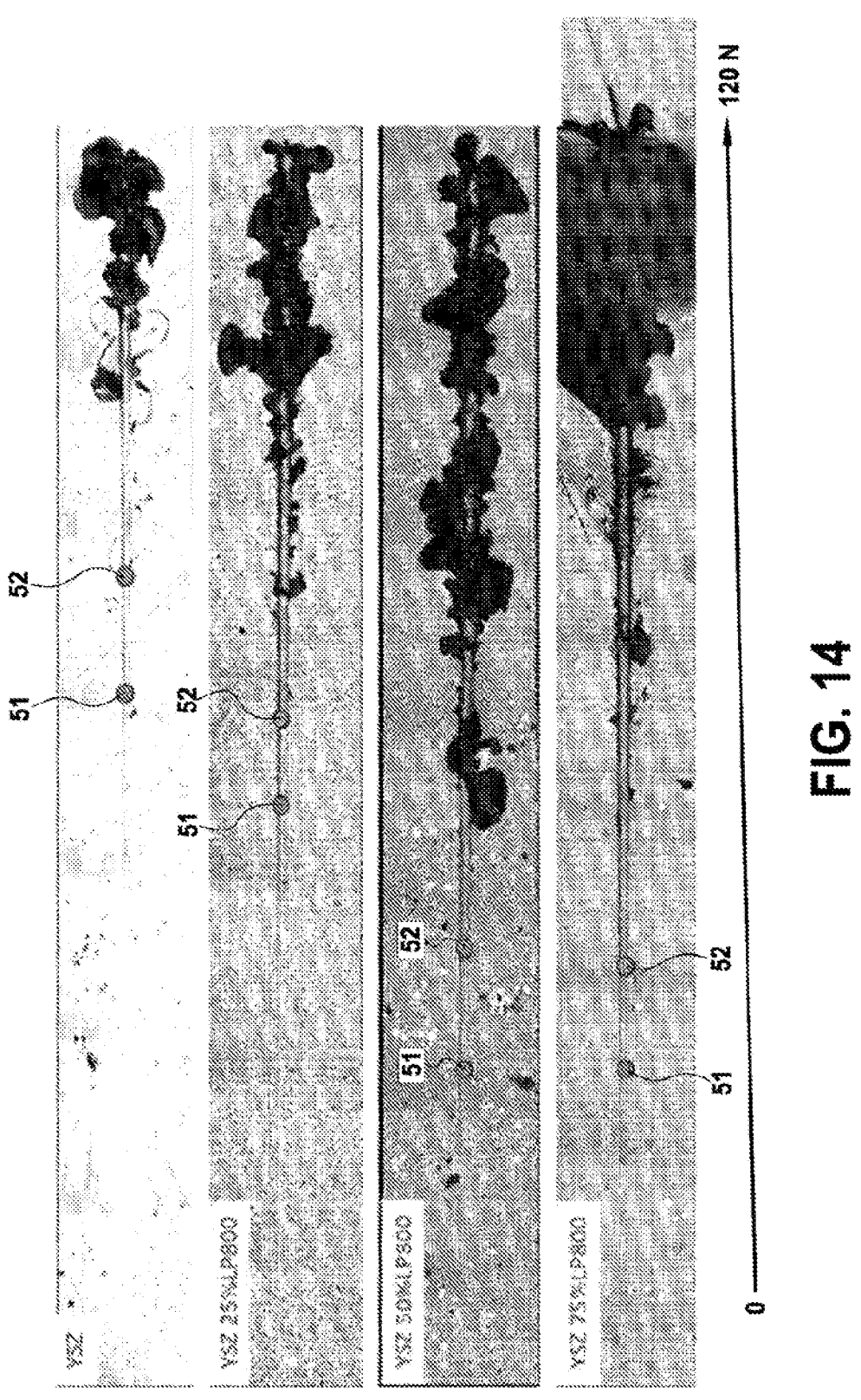
FIG. 14 illustrates the results of microscratch tests performed on the abradable layer for various inorganic filler contents.

FIG. 12 is another photograph showing this microstructure at a fracture produced in the abradable layer. Dense masses are obtained, having a porosity between 2 and 10%, which is less than the porosity of composites combining fibrous particles of yttria-stabilised zirconia and particles of $LaPO_4$. This figure also shows the strong debonding at the interface between the ceramic matrix and the inorganic filler. In particular, imprints can be seen on the enlarged inset image, left on the grains of $LaPO_4$ by the yttria-stabilised zirconia nanoparticles at the fracture surface. In FIGS. 13A, 13B and 14 then show the results of tests which have made it possible to highlight the contribution of the inorganic filler in a YSZ matrix compared with a conventional YSZ abradable layer YSZ.

FIGS. 13A and 13B thus illustrate results of Vickers microhardness tests (according to standard ASTM E384/ISO 6507) and single edge notch bend (SENB) toughness tests. In these tests, the abradable layers were obtained from powder compositions combining nanometric particles of yttria-stabilised zirconia and $LaPO_4$ fillers treated at 800° C. at different filler contents.

It is noted that these two mechanical properties decrease linearly as the $LaPO_4$ content increases. In particular, from 25 vol % $LaPO_4$, microhardness and toughness values are reached of the order of those of conventional YSZ abradable layers, even though the latter have a porosity between 20 and 50%.

FIG. 14 shows the results of microscratch tests. These tests consist in the penetration of a Rockwell indenter in the material, the speed of movement of the indenter and the pressure exerted by it being controlled. Through this test, it is possible to determine the mechanical behaviour of the material under pseudo-dynamic conditions at low loading speed and to highlight tribological phenomena such as spalling, cracking or even surface plasticity.

These tests have thus been performed under gradual loading from 0 to 120N over 10 mm. The four abradable layers tested are from powder compositions combining nanometric particles of yttria-stabilised zirconia and $LaPO_4$ fillers treated at 800° C.: in the first sample the $LaPO_4$ content is zero; in the second sample, the $LaPO_4$ content is equal to 25 vol %; in the third sample, the $LaPO_4$ content is equal to 50 vol %; and in the fourth sample, the $LaPO_4$ content is equal to 75 vol %. In each of the samples, the point of appearance of cracks 51 and the starting point of spalling 52 is identified.

Thus, a reduction is observed in the critical loads for cracking and spalling with the increase in the filler content, which confirms the $LaPO_4$ dislocator effect. In particular, the critical load for cracking changes from 66 N to 54 N from the addition of 25 vol % $LaPO_4$, while the critical load for spalling changes from 78 N to 63 N.

Figure 15:
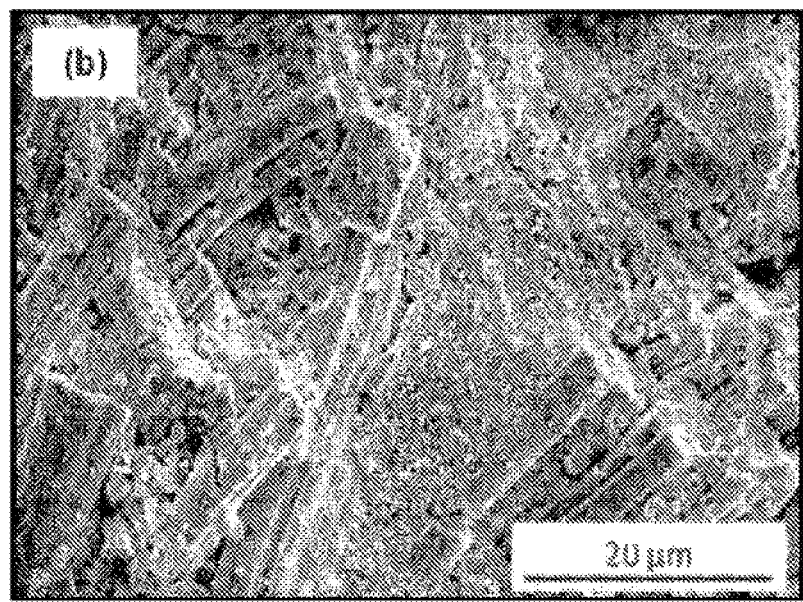
FIG. 15 is a scanning electron micrograph of a second abradable layer.

FIG. 15 illustrates the microstructure of a second example of an abradable layer obtained using a method according to the disclosure. In this second example, the powder composition comprised fibrous particles of yttria-stabilised zirconia at a level of 75 vol % and $LaPO_4$ particles at a level of 25 vol %. The LaPO$_4$ particles have previously undergone a thermal treatment step at 1000° C. for 120 minutes. The mixing of the powder composition was performed by dry mixing for 120 minutes with a mixing ratio Rm equal to 1:1.

The sintering was performed by spark plasma sintering with a compression pressure P$_c$ of 100 MPa, a sintering temperature T$_f$ of 1150° C. and a duration of 10 minutes.

FIGS. 16A to 16D then illustrate the test results that have made it possible to highlight the contribution of the inorganic filler in a YSZ fibrous matrix with a view to obtaining an abradable layer with reduced porosity, therefore more resistant to erosion.

Four samples were tested on an abradability bench comprising three blades fixed on a test disc: the position and the speed of the test disc relative to the samples was controlled so as to impose a speed of rotation of the blades of 210 m/s, a speed of incursion into the abradable of 15 μm/s and a penetration distance of 250 μm.

FIGS. 16A to 16D are thus photographs of the trace left by the test blades in the abradable layer of the sample.

Figure 16A:
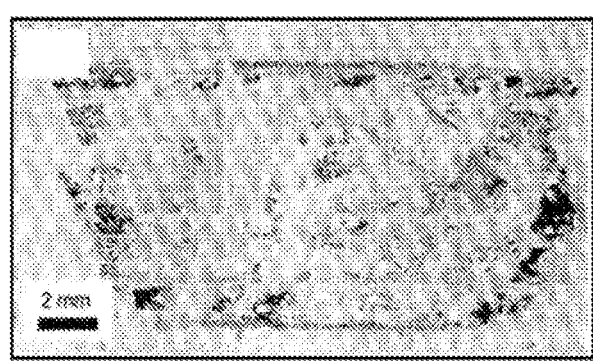
FIGS. 16A-16D illustrates traces from abradability tests on various abradable layers.

The first sample, the trace for which is visible in FIG. 16A, was obtained from a powder composition comprising only fibrous particles of yttria-stabilised zirconia. The sintering was performed by spark plasma sintering with a compression pressure P$_c$ of 100 MPa, a sintering temperature T$_f$ of 1100° C. and a duration of 5 minutes, resulting in a porosity of 34%. Bursting of the contact zone was observed, reflecting poor abradability of the sample.

Figure 16B:
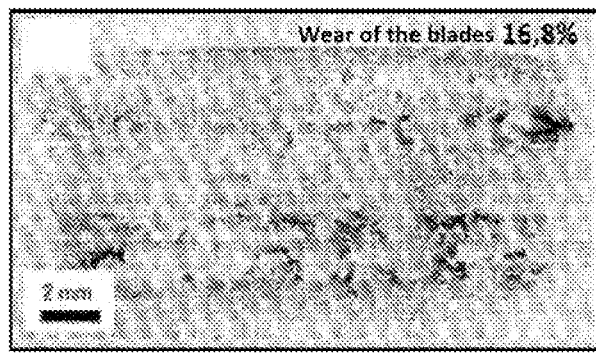

The second sample, for which the trace is visible in FIG. 16B, was obtained from a powder composition combining fibrous particles of yttria-stabilised zirconia and of LaPO$_4$ fillers treated at 800° C., at a level of 25 vol %. This powder composition underwent dry mixing with a mixing ratio Rm equal to 0:1. The sintering was performed by spark plasma sintering with a compression pressure P$_c$ of 100 MPa, a sintering temperature T$_f$ of 1050° C. and a duration of 5 minutes, resulting in a porosity of 32%. No bursting of the contact zone was observed, which reveals an abradable character; a metal transfer is however noted. After the test, the wear of the test blades was measured to be 16.8%.

Figure 16C:
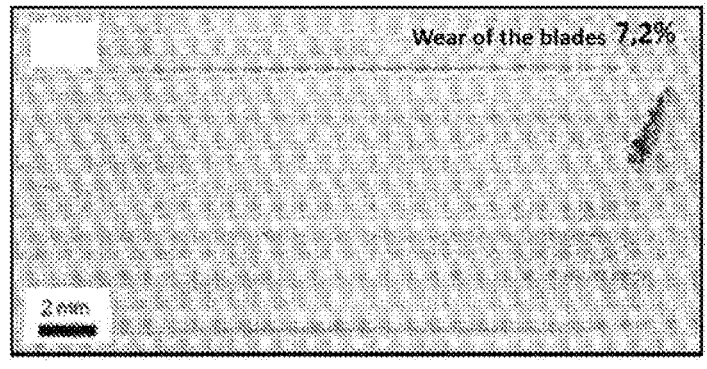

The third sample, the trace for which is visible in FIG. 16C, was obtained from a powder composition combining fibrous particles of yttria-stabilised zirconia and of LaPO$_4$ fillers treated at 1000° C., at a level of 25 vol %. This powder composition underwent dry mixing with a mixing ratio Rm equal to 1:1. The sintering was performed by spark plasma sintering with a compression pressure P$_c$ of 100 MPa, a sintering temperature T$_f$ of 1050° C. and a duration of 5 minutes, resulting in a porosity of 30%. No bursting of the contact zone was observed; the metal transfer was also very reduced, which reveals very good abradability. After the test, the wear of the test blades was measured to be 7.2%.

Figure 16D:
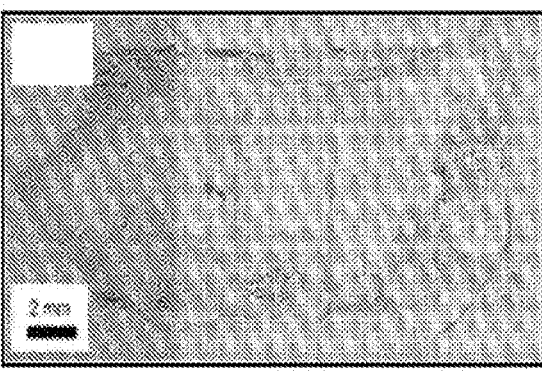

The fourth sample, for which the trace is visible in FIG. 16D, was obtained from a powder composition combining fibrous particles of yttria-stabilised zirconia and of LaPO$_4$ fillers treated at 1000° C., at a level of 25 vol %. This powder composition underwent dry mixing with a mixing ratio Rm equal to 1:1. The sintering was performed by spark plasma sintering with a compression pressure P$_c$ of 100 MPa, a sintering temperature T$_f$ of 1100° C. and a duration of 5 minutes, resulting in a porosity of 23%. Bursting of the contact zone was observed, leading to poor abradability of the sample.

Figure 17:
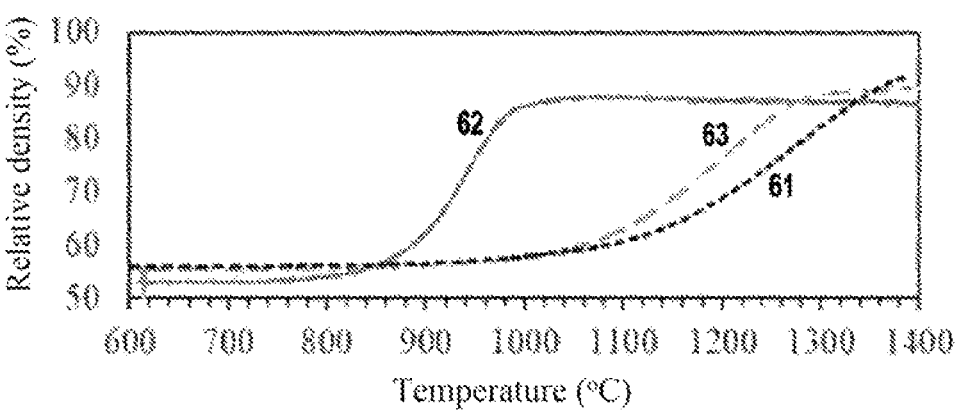
FIG. 17 illustrates results from a densification test for two powder compositions treated at different temperatures.

FIGS. 17 to 19 illustrate the results of another test highlighting the contribution of the temperature of the thermal pretreatment. In this test, two samples were prepared: the two samples were obtained from a powder composition combining fibrous particles of yttria-stabilised zirconia and particles of LaPO$_4$ filler at the level of 25 vol %.

In the two cases, the LaPO$_4$ fillers underwent a thermal treatment: in the first case, this thermal treatment was performed at 900° C.; in the second case, this thermal treatment was performed at 1100° C.

FIG. 17 then reveals the densification curve of the matrix 61, of the inorganic filler treated at 900° C., 62, and of the inorganic filler treated at 1100° C., 63, as a function of the sintering temperature under the conditions for production by SPS. It is thus observed that curve 63 is much closer to curve 61 than is curve 62; consequently, the matrix 64 and the LaPO$_4$ filler 65 consolidate practically simultaneously and therefore in a much more homogeneous manner during sintering.

Figure 18A:
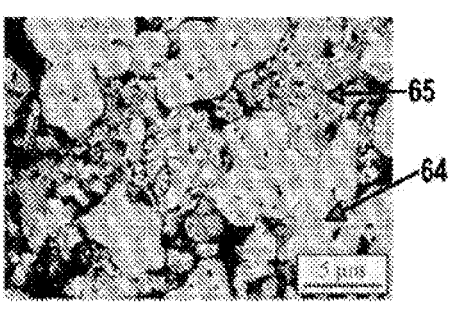
FIGS. 18A and 18B illustrate the microstructure of the abradable layers obtained by each of the powder compositions of the test of FIG. 17.
Figure 18B:
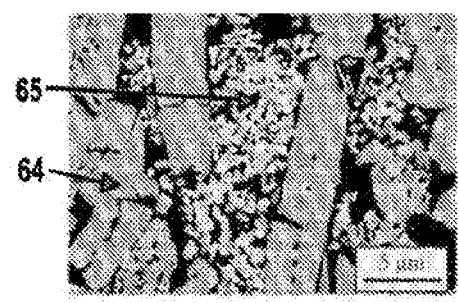

FIGS. 18A and 18B show the microstructure of each of the samples after a same SPS sintering step performed at 1050° C. under 100 MPa. It is thus noted in FIG. 18A relative to the first sample, and in FIG. 18B relative to the second sample, that the LaPO$_4$ 65 fillers have very different microstructures in terms of particle size, which influences the consolidation parameters between matrix 64 and filler 65.

Figure 19A:
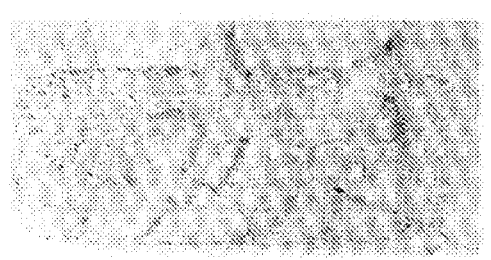
FIGS. 19A and 19B illustrate traces from abradability tests on the abradable layers obtained by each of the powder compositions of the test of FIG. 17.
Figure 19B:
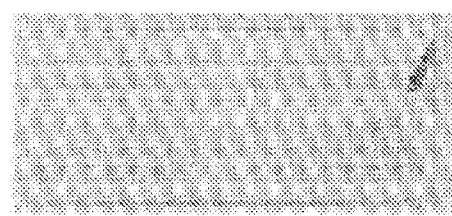

FIGS. 19A and 19B show the abradability behaviour of each of these two samples, for identical test parameters. It is thus noted in FIG. 19A that the sample for which the filler was treated at 900° C. has a massive break in the trace and therefore poor abradability behaviour. By contrast, in FIG. 19B, the sample for which the filler was treated at 1100° C. has an ideal abradability behaviour, without either break or transfer.

Although the present invention has been described by referring to specific exemplary embodiments, it is obvious that modifications and changes can be made to these examples without going beyond the general scope of the invention as defined by the claims. In particular, the individual features of different embodiments illustrated or mentioned can be combined in additional embodiments. Consequently, the description and the drawings should be considered as illustrating rather than limiting.

It is also obvious that all the features described in reference to a method can be transposed, alone or in combination, to a device, and inversely, all the features described in reference to a device can be transposed, alone or in combination, to a method.

The invention claimed is:

1. A method for manufacturing an abradable layer, the method comprising:

thermally pretreating an inorganic filler having a lamellar crystallographic structure, at least 80 vol. % of the inorganic filler being in a dehydrated phase at an end of the thermally pretreating;

preparing a powder composition comprising ceramic particles and the inorganic filler, a content of the inorganic filler in the powder composition being in a range of from 1 to 75 vol. %, the inorganic filler being a lanthanum oxide and comprising LaPO$_4$;

compressing the powder composition; and sintering the powder composition thus compressed, to obtain the abradable layer, wherein the thermally pretreating is performed at a temperature of 1100° C. for a duration in a range of from 30 to 120 minutes, wherein, during the sintering, the powder composition is subject to a uniaxial pressure in a range of from 25 to 100 MPa, wherein, during the sintering, the temperature is in a range of from 900 to 1200° C., wherein a duration of the sintering is in a range of from 1 to 30 minutes, and wherein a pressure, temperature, and duration of the sintering are applied so as to obtain a volumetric porosity ratio of the abradable layer in a range of from 0.1 to 50%.

2. The method of claim 1, wherein at least 50% by number of the ceramic particles have a form factor greater than or equal to 3.

3. The method of claim 1, wherein at least 50% by number of the ceramic particles have a form factor less than or equal to 1.5.

4. The method of claim 1, wherein the ceramic particles are particles of yttria-stabilized zirconia.

5. The method of claim 1, wherein the microhardness of the inorganic filler is less than the microhardness of the ceramic particles, wherein the Young's modulus of the inorganic filler is less than the Young's modulus of the ceramic particles, and wherein the toughness of the inorganic filler is less than the toughness of the ceramic particles.

6. The method of claim 1, wherein at least 95 vol. % of the inorganic filler is in the dehydrated phase.

7. The method of claim 1, wherein a content of the inorganic filler in the powder composition is in a range of from 10 to 50 vol. %.

8. The method of claim 1, further comprising:

mixing the powder composition, wherein the mixing is performed by dry mixing, and wherein the mixing has a duration in a range of from 5 minutes and 4 hours.

9. The method of claim 1, wherein the sintering is performed by spark plasma sintering.

10. A method for manufacturing a substrate coated by an abradable layer, the method comprising:

forming the abradable layer on a substrate by implementing the method of claim 1, thereby depositing the powder composition on a surface of the substrate, wherein the substrate is a turbomachine part.

11. A method for manufacturing a substrate coated by an abradable layer, the method comprising:

manufacturing an abradable layer by implementing the method of claim 1, depositing the abradable layer thus manufactured on a surface of the substrate, and joining the abradable layer thus deposited to the surface of the substrate, wherein the substrate is a turbomachine part.

12. The method of claim 1, wherein the volumetric porosity ratio of the abradable layer obtained is in a range of from 25 to 35%.

13. The method of claim 1, wherein at least 80% by number of the ceramic particles have a form factor greater than or equal to 3.

14. The method of claim 1, wherein at least 95% by number of the ceramic particles have a form factor less than or equal to 1.5.

15. The method of claim 1, wherein the ceramic particles comprise yttria-stabilized zirconia.

16. The method of claim 1, wherein the inorganic filler further comprises $La_2Zr_2O_7$.

17. The method of claim 1, further comprising:

dry mixing the powder composition using a three-dimensional dynamic mixer, wherein the three-dimensional dynamic mixer comprises mixing beads, wherein mass ratio of mixing beads to the powder composition is in a range of from 0:1 to 1:1, and wherein the duration of the dry mixing is in a range of from 5 minutes to 4 hours.

18. The method of claim 1, wherein during the sintering, the temperature is in a range from 1100 to 1200° C.

19. The method of claim 1, wherein the inorganic filler consists of $LaPO_4$.

* * * * *